US010182023B2

(12) United States Patent
Pycock et al.

(10) Patent No.: US 10,182,023 B2
(45) Date of Patent: Jan. 15, 2019

(54) INSTANT MESSAGING

(71) Applicant: Microsoft Technology Licensing, LLC, Redmond, WA (US)

(72) Inventors: James E. Pycock, Cambridge (GB); Mete Atamel, London (GB); Jimmy Enrico Jacques Holzer, London (GB); Jakob O. Engstrand, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 150 days.

(21) Appl. No.: 14/530,644

(22) Filed: Oct. 31, 2014

(65) Prior Publication Data
US 2016/0036735 A1 Feb. 4, 2016

(30) Foreign Application Priority Data

Jul. 31, 2014 (GB) .................................. 1413581.8

(51) Int. Cl.
H04L 12/58 (2006.01)
H04L 29/08 (2006.01)

(52) U.S. Cl.
CPC .............. H04L 51/04 (2013.01); H04L 51/20 (2013.01); H04L 67/10 (2013.01); H04L 67/18 (2013.01); H04L 51/046 (2013.01); H04L 51/10 (2013.01)

(58) Field of Classification Search
CPC ......... H04L 51/20; H04L 67/10; H04L 67/18; H04L 12/5865; H04L 12/581; H04L 12/5855

(Continued)

(56) References Cited

U.S. PATENT DOCUMENTS 7,305,627 B2 12/2007 Tannenbaum
7,428,702 B1 9/2008 Cervantes et al.
(Continued)

FOREIGN PATENT DOCUMENTS

EP 1624613 2/2006
EP 2538375 12/2012
(Continued)

OTHER PUBLICATIONS

"International Search Report and Written Opinion", Application No. PCT/US2015/041990, dated Oct. 23, 2015, 13 Pages.
(Continued)

Primary Examiner — Joseph E Avellino
Assistant Examiner — Binod J Kunwar
(74) Attorney, Agent, or Firm — NovoTechIP International PLLC

(57) ABSTRACT

A method implemented by a client application when executed on a user device during an instant messaging communication between said user device and at least one further device, the method comprising: transmitting a first message comprising media data over a communication network from said user device to said at least one further device; receiving a second message comprising further media data transmitted over said communication network from said at least one further device; determining that the media data and the further media data are of the same data type; and generating a composite media object based on the media data and the further media data in response to said determination and displaying the composite media object on a display of said user device.

20 Claims, 5 Drawing Sheets

(58) Field of Classification Search
USPC .......................................... 709/206; 455/457
See application file for complete search history.

(56) References Cited

U.S. PATENT DOCUMENTS

| | | | |
|---|---|---|---|
| 7,555,386 B2 | 6/2009 | Song | |
| 7,643,833 B2* | 1/2010 | Sankisa | H04W 88/02 |
| | | | 455/41.2 |
| 7,801,542 B1 | 9/2010 | Stewart | |
| 7,805,148 B2* | 9/2010 | Lovell, Jr. | H04W 60/00 |
| | | | 455/456.1 |
| 8,055,296 B1* | 11/2011 | Persson | G02B 27/017 |
| | | | 455/456.1 |
| 8,121,619 B1* | 2/2012 | Ghosh | H04W 4/02 |
| | | | 455/404.2 |
| 8,260,852 B1 | 9/2012 | Cselle | |
| 8,301,169 B2* | 10/2012 | Hung | G06Q 10/109 |
| | | | 455/404.2 |
| 8,369,867 B2* | 2/2013 | Van Os | H04W 4/02 |
| | | | 370/310.2 |
| 8,391,909 B2* | 3/2013 | Stewart | G06Q 50/01 |
| | | | 455/518 |
| 8,554,802 B1 | 10/2013 | Barden et al. | |
| 8,751,589 B2* | 6/2014 | Ross | H04W 4/029 |
| | | | 709/206 |
| 8,787,888 B2* | 7/2014 | Bridge | H04L 65/1003 |
| | | | 455/415 |
| 8,996,045 B2* | 3/2015 | Bowman | G01C 21/26 |
| | | | 455/456.1 |
| 9,344,849 B2* | 5/2016 | Snyder | H04W 4/025 |
| 9,503,843 B2* | 11/2016 | Tofighbakhsh | H04W 4/02 |
| 9,826,496 B2* | 11/2017 | Hinnegan | H04W 64/00 |
| 2004/0260780 A1 | 12/2004 | Eisen | |
| 2005/0065632 A1 | 3/2005 | Douglis et al. | |
| 2005/0193333 A1 | 9/2005 | Ebert | |
| 2005/0288036 A1* | 12/2005 | Brewer | H04W 8/18 |
| | | | 455/456.2 |
| 2006/0026256 A1 | 2/2006 | Diddee et al. | |
| 2007/0124387 A1 | 5/2007 | Galloway | |
| 2007/0192166 A1 | 8/2007 | Luchene | |
| 2007/0192168 A1 | 8/2007 | Van Luchene | |
| 2008/0059580 A1* | 3/2008 | Kalinowski | G06Q 10/107 |
| | | | 709/204 |
| 2008/0119176 A1* | 5/2008 | Chen | G01C 21/20 |
| | | | 455/414.2 |
| 2008/0119200 A1* | 5/2008 | McConnell | H04W 4/02 |
| | | | 455/456.1 |
| 2008/0132251 A1* | 6/2008 | Altman | G06Q 30/0207 |
| | | | 455/457 |
| 2008/0133671 A1 | 6/2008 | Kalaboukis | |
| 2008/0147803 A1 | 6/2008 | Krzyzanowski | |
| 2008/0171555 A1* | 7/2008 | Oh | G01C 21/20 |
| | | | 455/456.1 |
| 2008/0189620 A1 | 8/2008 | Bonforte et al. | |
| 2008/0201434 A1 | 8/2008 | Holmes | |
| 2008/0298386 A1 | 12/2008 | Fiatal | |
| 2009/0047972 A1* | 2/2009 | Neeraj | G06Q 10/10 |
| | | | 455/456.1 |
| 2009/0138563 A1* | 5/2009 | Zhu | H04W 4/14 |
| | | | 709/206 |
| 2009/0156181 A1* | 6/2009 | Athsani | H04L 67/06 |
| | | | 455/414.2 |
| 2009/0170525 A1* | 7/2009 | Baghdasaryan | G01S 5/0072 |
| | | | 455/456.1 |
| 2009/0227270 A1* | 9/2009 | Naaman | H04W 4/025 |
| | | | 455/456.6 |
| 2009/0254840 A1* | 10/2009 | Churchill | G06F 3/0481 |
| | | | 715/753 |
| 2009/0299824 A1 | 12/2009 | Barnes, Jr. | |
| 2009/0319616 A1* | 12/2009 | Lewis, II | H04W 24/00 |
| | | | 709/206 |
| 2009/0325603 A1* | 12/2009 | Van Os | H04W 4/02 |
| | | | 455/456.2 |
| 2010/0151880 A1* | 6/2010 | Jang | H04L 51/38 |
| | | | 455/456.1 |
| 2011/0119133 A1* | 5/2011 | Igelman | G06Q 30/0261 |
| | | | 705/14.58 |
| 2011/0137814 A1* | 6/2011 | Stewart | G06Q 50/01 |
| | | | 705/319 |
| 2011/0193795 A1 | 8/2011 | Seidman et al. | |
| 2012/0084247 A1 | 4/2012 | Aguera y Arcas et al. | |
| 2012/0166531 A1* | 6/2012 | Sylvain | H04L 51/043 |
| | | | 709/204 |
| 2012/0183172 A1* | 7/2012 | Stroila | G01C 21/3602 |
| | | | 382/100 |
| 2012/0220316 A1* | 8/2012 | Jang | H04L 12/5895 |
| | | | 455/457 |
| 2012/0246580 A1 | 9/2012 | Bouverat | |
| 2012/0265635 A1 | 10/2012 | Forsblom et al. | |
| 2012/0265823 A1* | 10/2012 | Parmar | H04W 4/02 |
| | | | 709/206 |
| 2012/0296987 A1* | 11/2012 | Cuervo | H04L 51/20 |
| | | | 709/206 |
| 2013/0055112 A1 | 2/2013 | Joseph et al. | |
| 2013/0179221 A1 | 7/2013 | Xamonthene | |
| 2013/0226453 A1* | 8/2013 | Trussel | H04L 51/20 |
| | | | 701/533 |
| 2013/0238974 A1 | 9/2013 | Beltramo, Jr. et al. | |
| 2013/0339091 A1 | 12/2013 | Humay | |
| 2014/0047358 A1 | 2/2014 | Park et al. | |
| 2014/0066105 A1* | 3/2014 | Bridge | H04L 65/1003 |
| | | | 455/457 |
| 2014/0101263 A1 | 4/2014 | Wu et al. | |
| 2014/0181698 A1* | 6/2014 | Choi | H04L 51/20 |
| | | | 715/758 |
| 2014/0329548 A1* | 11/2014 | Tharshanan | H04W 4/12 |
| | | | 455/457 |
| 2015/0133158 A1* | 5/2015 | Tofighbakhsh | H04W 4/02 |
| | | | 455/456.2 |
| 2016/0034162 A1 | 2/2016 | Atamel et al. | |
| 2016/0036737 A1 | 2/2016 | Atamel et al. | |
| 2016/0234665 A1* | 8/2016 | Lohtia | H04L 12/189 |

FOREIGN PATENT DOCUMENTS

| | | |
|---|---|---|
| GB | 2449452 | 11/2008 |
| JP | 2008160529 | 7/2008 |

OTHER PUBLICATIONS

Cao, et al., "An Instant Messaging System Based on Google Map", In Proceedings: 2nd International Conference on Advanced Computer Control, vol. 5, Mar. 27, 2010, 4 pages.

Constine, "Facebook Messenger: a New Standalone Group Messaging Mobile App Built Off Beluga", Retrieved From: <http://www.insidefacebook.com/2011/08/09/facebook-messenger/> Apr. 1, 2014, Aug. 9, 2011, 5 pages.

"Second Written Opinion Issued in PCT Application No. PCT/US2015/041990", dated Jun. 23, 2016, 9 Pages.

"International Preliminary Report on Patentability Issued in PCT Application No. PCT/US2015/041990", dated Oct. 14, 2016, 10 Pages.

"Create and Share Online Polls Directly on Twitter—Twoll", Retrieved From:<http://www.geekscentre.com/2013/06/create-and-share-online-polls-directly.html> May 13, 2014, Jun. 2013, 5 pages.

"Final Office Action", U.S. Appl. No. 14/498,544, dated May 1, 2017, 22 pages.

"Final Office Action", U.S. Appl. No. 14/498,802, dated Dec. 12, 2016, 17 pages.

"How Do I Get My Polls on Facebook?", Retrieved From: <http://support.polldaddy.com/how-do-i-get-my-poll-on-facebook/> May 13, 2014, Mar. 9, 2012, 6 pages.

"How to Edit or Remove and Recall Skype Sent Chat Messages", Retrieved From: <http://www.mydigitallife.info/how-to-edit-or-remove-and-recall-skype-sent-chat-messages/> May 13, 2014, Jan. 15, 2009, 1 page.

"International Preliminary Report on Patentability", Application No. PCT/US2015/041890, dated Oct. 14, 2016, 10 pages.

(56) References Cited

OTHER PUBLICATIONS

"International Preliminary Report on Patentability", Application No. PCT/US2015/041895, dated Oct. 13, 2016, 12 pages.

"International Search Report and Written Opinion", Application No. PCT/US2015/041890, dated Nov. 10, 2015, 12 pages.

"International Search Report and Written Opinion", Application No. PCT/US2015/041895, dated Nov. 4, 2015, 14 pages.

"Non-Final Office Action", U.S. Appl. No. 14/498,544, dated Nov. 16, 2016, 19 pages.

"Non-Final Office Action", U.S. Appl. No. 14/498,802, dated May 31, 2017, 20 pages.

"Non-Final Office Action", U.S. Appl. No. 14/498,802, dated Jul. 15, 2016, 16 pages.

"Second Written Opinion", Application No. PCT/US2015/041890, dated Jun. 24, 2016, 9 pages.

"Second Written Opinion", Application No. PCT/US2015/041895, dated Jun. 23, 2016, 11 pages.

"Sending Instant Messages (Windows Desktop)", Retrieved From: <https://support.skype.com/en/faq/FA3271/sending-instant-messages-windows-desktop> May 13, 2014, Apr. 12, 2013, 9 pages.

Rejhon,"XEP-0301: In-Band Real Time Text", Retrieved From:<http://www.xmpp.org/extensions/xep-0301.html> May 13, 2014, Jul. 12, 2011, 28 pages.

Voo,"Create Social-Friendly Polls Easily With Opinion Stage", Retrieved From: <http://www.hongkiat.com/blog/free-website-polls-opinion-stage/> May 13, 2014, Sep. 22, 2013, 6 pages.

"Final Office Action", U.S. Appl. No. 14/498,544, dated Jun. 22, 2018, 19 pages.

"Non-Final Office Action", U.S. Appl. No. 14/498,544, dated Nov. 9, 2017, 25 pages.

"Office Action Issued in European Patent Application No. 15748126.8", dated Mar. 5, 2018, 8 Pages.

"Foreign Office Action", EP Application No. 15748123.5, dated Mar. 5, 2018, 11 pages.

"Foreign Office Action", EP Application No. 15748124.3, dated Mar. 5, 2018, 13 pages.

"Final Office Action", U.S. Appl. No. 14/498,802, dated Jan. 26, 2018, 25 pages.

"Office Action Issued in European Patent Application No. 15748126.8", dated Jul. 23, 2018, 11 Pages.

\* cited by examiner

INSTANT MESSAGING

RELATED APPLICATIONS

This application claims priority under 35 USC § 119 or § 365 to Great Britain Patent Application No. 1413581.8, filed Jul. 31, 2014, the disclosure of which is incorporate in its entirety.

BACKGROUND

Packet-based communication systems allow the user of a device, such as a personal computer, to communicate across the computer network using a packet protocol such as Internet Protocol (IP). Packet-based communication systems can be used for various types of communication events. Communication events which can be established include voice calls, video calls, instant messaging, voice mail, file transfer and others. These systems are beneficial to the user as they are often of significantly lower cost than fixed line or mobile networks. This may particularly be the case for long-distance communication. To use a packet-based system, the user installs and executes client software on their device. The client software provides the packet-based connections as well as other functions such as registration and authentication.

Communications systems allow users of devices to communicate across a computer network such as the internet. Communication events which can be established include voice calls, video calls, instant messaging, voice mail, file transfer and others.

An instant messaging communication session allows a chat to be conducted between users of computer devices via a computer network. Each user can enter text into a field, actuate a send button and thereby create an instant message which is communicated to another user.

SUMMARY

According to one aspect of the present disclosure there is provided a method implemented by a client application when executed on a user device during an instant messaging communication between said user device and at least one further device, the method comprising: transmitting a first message comprising media data over a communication network from said user device to said at least one further device; receiving a second message comprising further media data transmitted over said communication network from said at least one further device; determining that the media data and the further media data are of the same data type; and generating a composite media object based on the media data and the further media data in response to said determination and displaying the composite media object on a display of said user device.

According to a further aspect of the present disclosure there is provided a user device comprising: a display; a network interface configured to transmit and receive messages between the user device and at least one further user device over a communication network during an instant messaging communication; one or more processors configured to run a client application, wherein the client application is configured to: transmit a first message comprising media data over a communication network from said user device to said at least one further device; receive a second message comprising further media data transmitted over said communication network from said at least one further device; determine that the media data and the further media data are of the same data type; generate a composite media object based on the media data and the further media data in response to said determination; and display the composite media object on said display of the user device.

According to another aspect of the present disclosure there is provided a computer program product, the computer program product being embodied on a computer-readable medium and configured so as when executed on a processor of a user device to: transmit a first message comprising media data over a communication network from said user device to said at least one further device; receive a second message comprising further media data transmitted over said communication network from said at least one further device; determine that the media data and the further media data are of the same data type; generate a composite media object based on the media data and the further media data in response to said determination; and display the composite media object on a display of the user device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

For a better understanding of the present disclosure and to show how the same may be put into effect, reference will now be made, by way of example, to the following drawings in which.

DETAILED DESCRIPTION

Embodiments of the present disclosure are described by way of example only.

Figure 1:
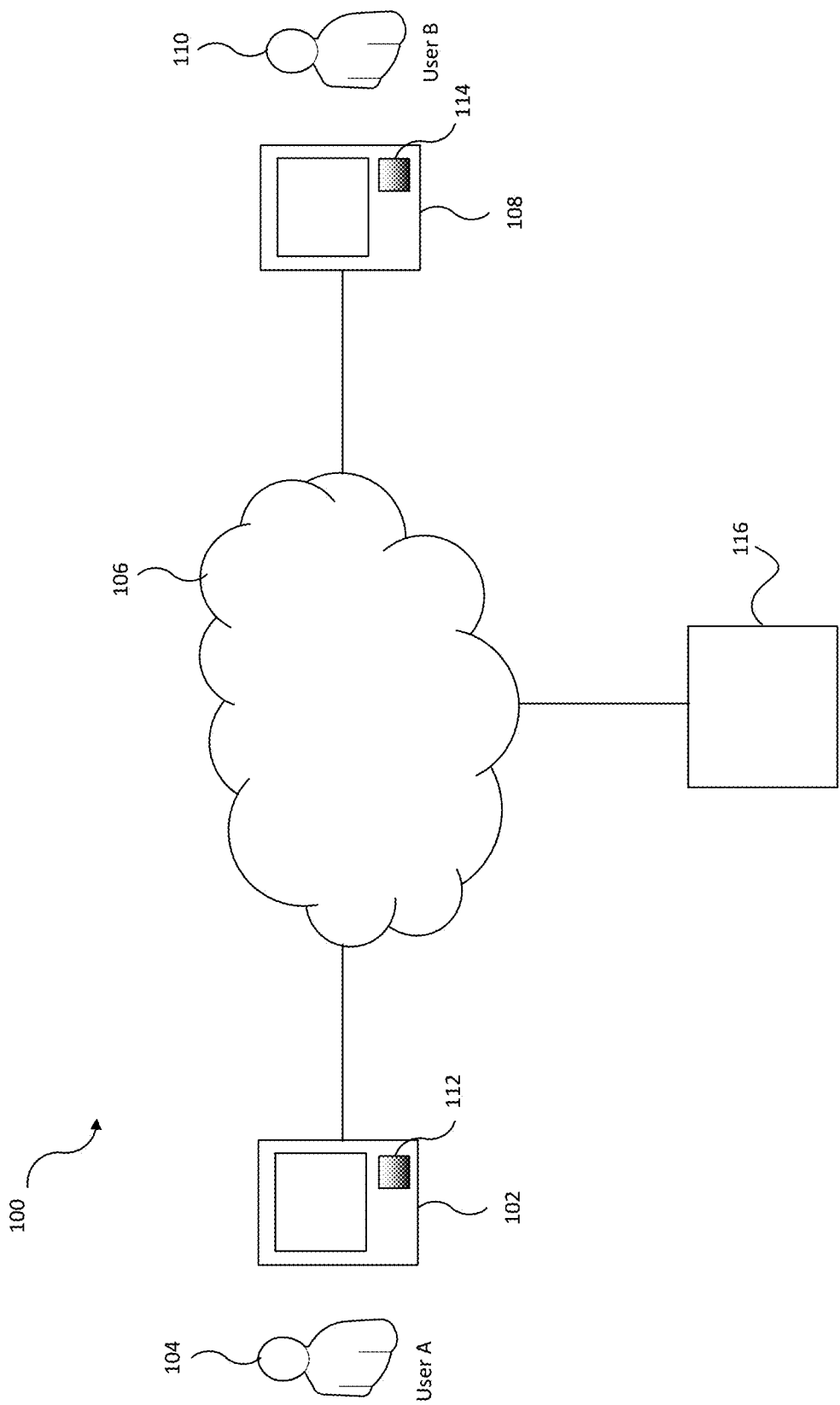
FIG. 1 shows a communication system.

FIG. 1 shows a communication system 100 comprising a first user 104 (User A) who is associated with a user terminal 102 and a second user 110 (User B) who is associated with a user terminal 108. The user terminals 102 and 108 can communicate over a communication network 106 in the communication system 100, thereby allowing the users 104 and 110 to communicate with each other over the communication network 106. The communication network 106 may be any suitable network which has the ability to provide a communication channel between the user terminal 102 and the second user terminal 108. For example, the communication network 106 may be the Internet or another type of network such as a High data rate mobile network, such as a $3^{rd}$ generation ("3G") mobile network.

Note that in alternative embodiments, user terminals can connect to the communication network 106 via an additional intermediate network not shown in FIG. 1. For example, if the user terminal 102 is a mobile device, then it can connect to the communication network 106 via a cellular mobile network (not shown in FIG. 1), for example a GSM or UMTS network.

The user terminal 102 may be, for example, a mobile phone, a personal digital assistant ("PDA"), a personal computer ("PC") (including, for example, Windows™, Mac OS™ and Linux™ PCs), a tablet computer, a gaming device or other embedded device able to connect to the communication network 106. The user terminal 102 is arranged to receive information from and output information to User A 104.

The user terminal 102 executes a communication client application 112, provided by a software provider associated with the communication system 100. The communication client application 112 is a software program executed on a local processor in the user terminal 102. The communication client application 112 performs the processing required at the user terminal 102 in order for the user terminal 102 to transmit and receive data over the communication system 100. The communication client application 112 executed at the user terminal 102 may be authenticated to communicate over the communication system through the presentation of digital certificates (e.g. to prove that user 104 is a genuine subscriber of the communication system—described in more detail in WO 2005/009019).

The user terminal 108 may correspond to the user terminal 102. The user terminal 108 executes, on a local processor, a communication client application 114 which corresponds to the communication client application 112 executed at the user terminal 102. The communication client application 114 at the user terminal 108 performs the processing required to allow User 110 to communicate over the network 106 in the same way that the communication client application 112 at the user terminal 102 performs the processing required to allow the User A 104 to communicate over the network 106. The user terminals 102 and 108 are end points in the communication system. FIG. 1 shows only two users (104 and 110) and two user terminals (102 and 108) for clarity, but many more users and user devices may be included in the communication system 100, and may communicate over the communication system 100 using respective communication clients executed on the respective user devices, as is known in the art.

The messages exchanged during an instant messaging communication session are transmitted over the network 106. They may be transmitted via a network entity (e.g. a server) connected to the network 106 between the user terminals. Alternatively or additionally, the messages of the communication session may be transmitted on point-to-point routes between the user terminals (i.e. a route that does not go via any server in the communication system 100), as is known in the art As shown in FIG. 1, a mapping server 116 which is arranged to store map data is connected to the network 106. The mapping server 116 may be implemented on a single computing device. The mapping server 116 may also operate to support performance of the relevant operations in a "cloud computing" environment whereby at least some of the operations may be performed by a plurality of computing devices.

Figure 2:
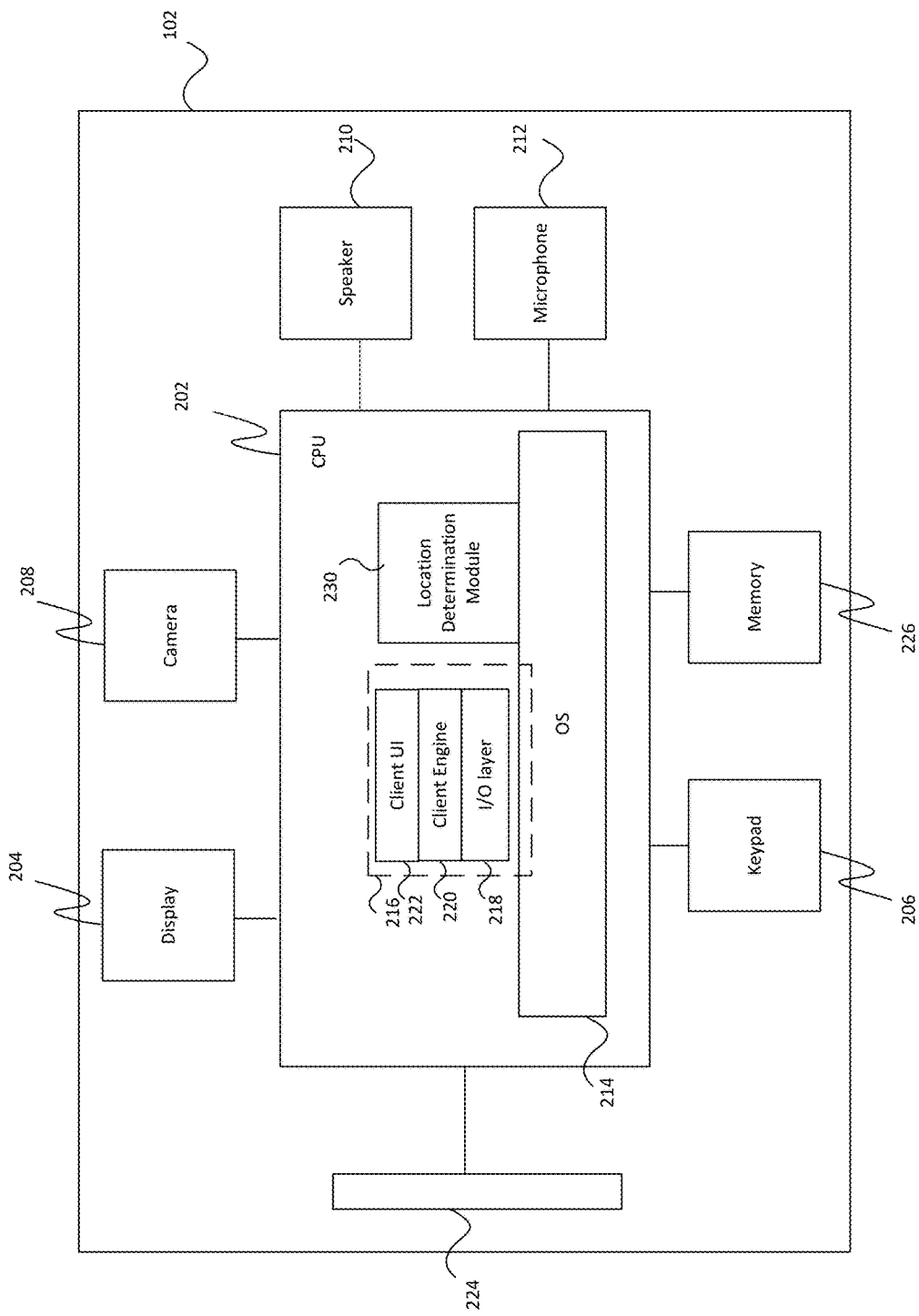
FIG. 2 shows a schematic view of a user terminal.

FIG. 2 illustrates a detailed view of the user terminal 102 on which is executed a communication client application for communicating over the communication system 100. The user terminal 102 comprises a central processing unit ("CPU") 202, to which is connected a display 204 such as a screen or touch screen, input devices such as a keypad 206, a camera 208, and touch screen 204. An output audio device 210 (e.g. a speaker) and an input audio device 212 (e.g. a microphone) are connected to the CPU 202. The display 204, keypad 206, camera 208, output audio device 210 and input audio device 212 may be integrated into the user terminal 102 as shown in FIG. 2. In alternative user terminals one or more of the display 204, the keypad 206, the camera 208, the output audio device 210 and the input audio device 212 may not be integrated into the user terminal 102 and may be connected to the CPU 202 via respective interfaces. One example of such an interface is a USB interface. The CPU 202 is connected to a network interface 224 such as a modem for communication with the communication network 106. The network interface 224 may be integrated into the user terminal 102 as shown in FIG. 2. In alternative user terminals the network interface 224 is not integrated into the user terminal 102. The user terminal 102 also comprises a memory 226 for storing data as is known in the art. The memory 226 may be a permanent memory, such as ROM. The memory 226 may alternatively be a temporary memory, such as RAM.

The user terminal 102 is installed with the communication client application 112, in that the communication client application 112 is stored in the memory 226 and arranged for execution on the CPU 202. FIG. 2 also illustrates an operating system ("OS") 214 executed on the CPU 202. Running on top of the OS 214 is a software stack 216 for the communication client application 112 referred to above. The software stack shows an I/O layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the communication network 106 via the network interface 224. The I/O layer 218 comprises audio and/or video codecs which receive incoming encoded streams and decodes them for output to speaker 210 and/or display 204 as appropriate, and which receive unencoded audio and/or video data from the microphone 212 and/or camera 208 and encodes them for transmission as streams to other end-user terminals of the communication system 100. The client engine layer 220 handles the connection management functions of the VoIP system as discussed above, such as establishing calls or other connections by server-based or P2P address look-up and authentication. The client engine may also be responsible for other secondary functions not discussed herein. The client engine 220 also communicates with the client user interface layer 222. The client engine 220 may be arranged to control the client user interface layer 222 to present information to the user of the user terminal 102 via the user interface of the client which is displayed on the display 204 and to receive information from the user the user terminal 102 via the user interface.

Also running on top of the OS 214, is a location determination module 230. The location determination module 230 determines the location of the user terminal 102. The location determination module 230 uses geographic location technology for determining the location of the user terminal 102, in terms of geographic position relative to the surface of the earth; for example, a satellite based positioning system such as GPS (Global Positioning System, including potential variants such as assisted GPS or differential GPS), GLONASS (Global Navigation Satellite System) or Galileo; and/or trilateration (or more generally muiltilateration) relative to a plurality of different wireless base stations or access points having known locations; and/or a technique based on detecting signal strength relative to a known base station or access point. Other well-known methods may be used for the user terminal 102 to determine its location.

A method implemented during an instant messaging communication session between User A 104 associated with user terminal 102 and User B 110 associated with user terminal 108 over the communications network 106 will now be described with reference to FIG. 3 which is a flow chart for a process 300 of generating a composite media object.

Figure 4A:
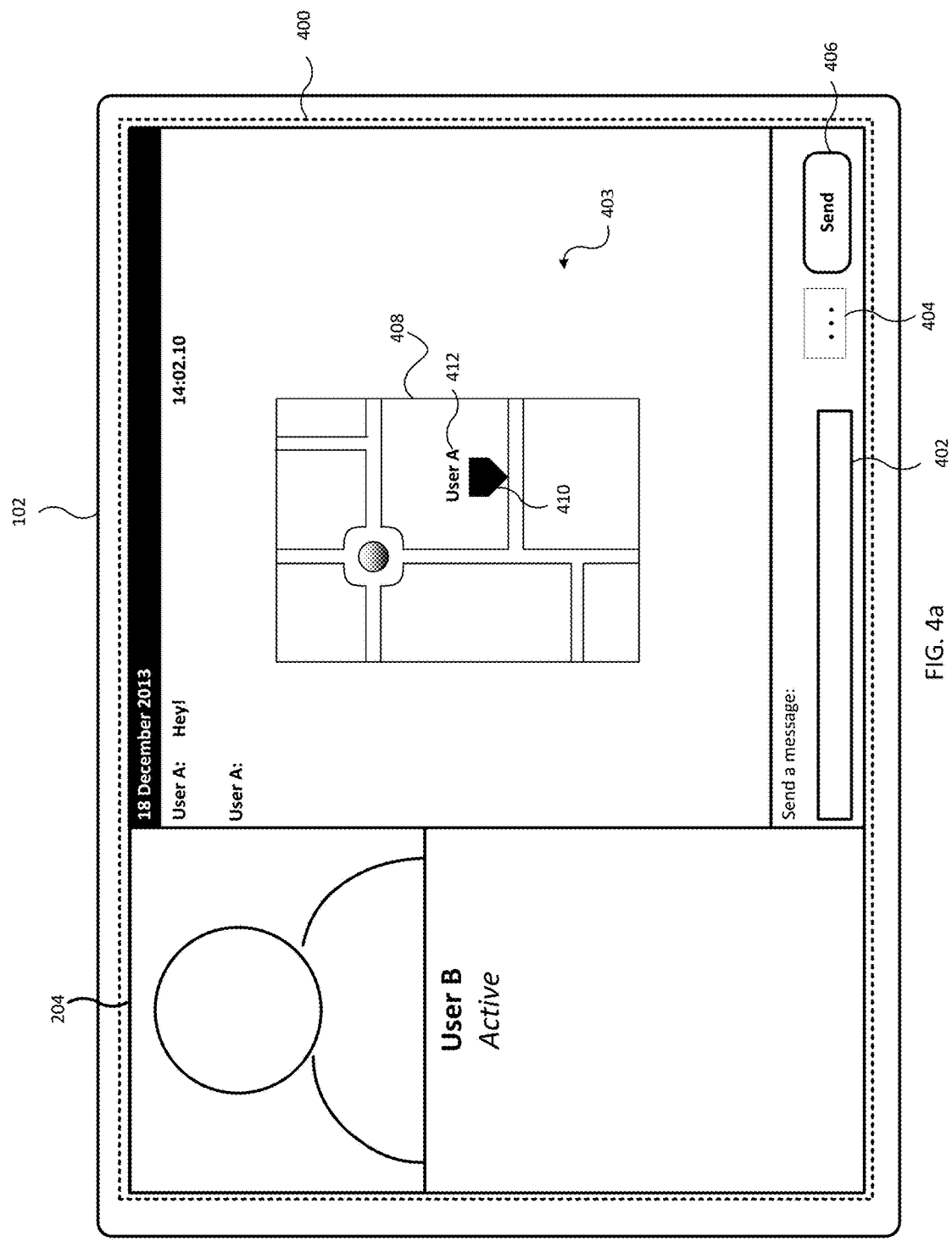
FIG. 4a illustrates a user terminal displaying a transmitted message.
Figure 4B:
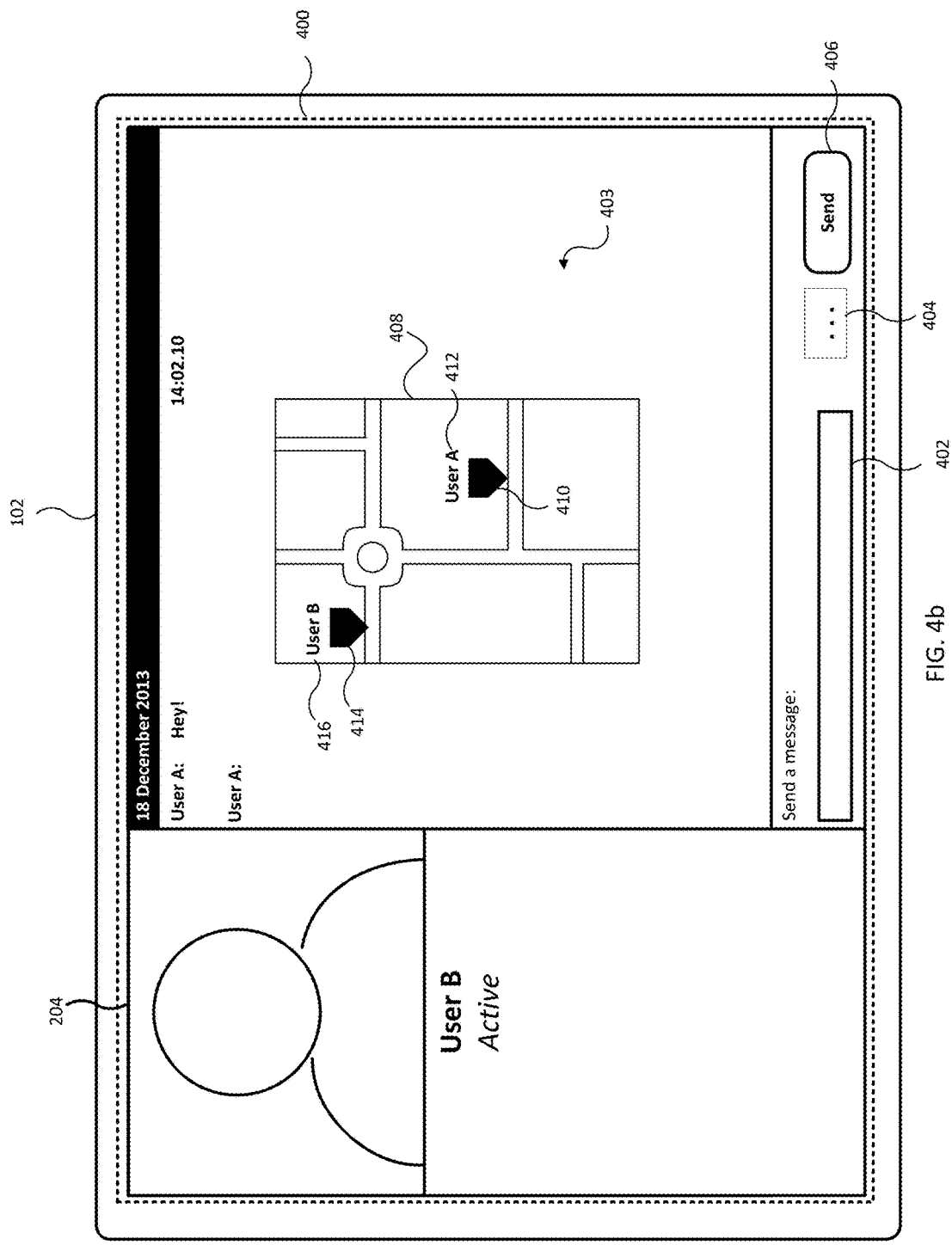
FIG. 4b illustrates a user terminal displaying a composite media object.

Reference will also be made to FIGS. 4a and 4b which illustrate exemplary client user interfaces presented in various embodiments as part of the process 300.

The client user interface provided by the communication client application 112 executed on user terminal 102 is operable to display text input by User A 104 to be transmitted in a message of the instant messaging communication session but which has not yet been transmitted. Specifically, the communication client application 112 displays via the client user interface a message field 402 (shown in FIG. 4a) into which User A 104 is able to enter text using for example the touch screen 204 or keypad 206. The client user interface displays a selectable send option 406 which User A 104 can select after inputting such text. In response, the communication client application 112 creates a message containing the input text and transmits the created message via the communication network 106 to user terminal 108. Messages transmitted from user terminal 102 and messages received from user terminal 108 are displayed in a chat window 403 of the user interface provided by the communication client application 112.

At step S302, the communication client application 112 detects a selection by User A 104 to send the location of user terminal 102 to user terminal 108 based on detecting an interaction with the client user interface provided by the communication client application 112. The communication client application 112 may display via the client user interface a menu button (404 in FIGS. 4a and 4b) which User A 104 is able to select using an appropriate input device such as a mouse (not shown in FIG. 2), keypad 206 or using the touch screen 204. By navigating through menu options, User A 104 is able to make an appropriate selection to send the location of user terminal 102 to user terminal 108. Alternatively or additionally, the communication client application 112 may display via the client user interface a dedicated button for the transmission of the location of user terminal 102 to user terminal 108.

In response to the detection at step S302, the process 300 proceeds to step S304.

At step S304 the communication client application 112 requests location information from the location determination module 230. Upon receiving this request, the location determination module 230 determines the location of the user terminal 102 and supplies this location information to the communication client application 112. The communication client application 112 transmits a message comprising this location information (e.g. a first location message) over the communications network 106 to user terminal 108. The location information may comprise a longitude and latitude of the user terminal 102. The location information may additionally comprise an altitude of the user terminal 102.

At step S306, the communication client application 112 transmits the location information, with a request for map data via the network interface 224 to the mapping server 116. The mapping server 116 stores a large set of pre-generated map tile images covering the entire globe, each map tile has a z coordinate describing its zoom level and x and y co-ordinates describing its position. For each zoom level there is a predetermined number of map tile images to cover the entire globe, whereby the greater the zoom level, the greater the number of predetermined number of map tile images are required to cover the entire globe. A single map tile at a lower zoom level illustrates a larger geographic area than a single map tile at a higher zoom level.

The mapping server 116 determines, based on the received location information, a subset of map tile images of the large set of pre-generated map tile images stored by the mapping server 116. The mapping server 116 transmits the subset of map tile images to the communication client application 112 with an indication of the location of the user terminal 102 with reference to the subset of map tile images.

The communication client application 112 then displays a map 408 formed of the subset of map tile images on the display 204. The generated map provides a diagrammatic representation of an area of land or sea in the vicinity of the user terminal 102 at an appropriate scale. For example, the generated map may show roads, parks, railway lines, rivers, hospitals, landmarks etc. The communication client application 112 displays a visual indicator 410 (e.g. pointer, marker or icon) of the location of the user terminal 102 on the display 204 with reference to the displayed map 408. The communication client application 112 may also display the username 412 of User A 104, which is used to uniquely identify User A 104 to other users of the communication system 100, in close proximity to the visual indicator 410 to convey that the visual indicator 410 is indicating User A's location.

As shown in FIG. 4a, the communication client application 112 displays the map 408 in the chat window 403 of the user interface provided by the communication client application 112 (i.e. the area of the user interface in which messages exchanged during the instant messaging communication session are displayed).

In response to receiving the message comprising the location information of user terminal 102, the communication client application 114 executed on user terminal 108 transmits the received location information, with a request for map data to the mapping server 116 in order to retrieve a subset of map tile images with an indication of the location of the user terminal 102 with reference to subset of map tile images.

The communication client application 114 then displays map 408 formed of the subset of map tile images on the display 204 in the chat window 403 of the user interface provided by the communication client application 114.

In response to receiving the location message from User A 104, User B 110 may reply by sending the location of user terminal 108 to user terminal 102. That is, the communication client application 114 transmits a message comprising location information of user terminal 108 (e.g. a second location message) over the communications network 106 to user terminal 102.

At step S308, the communication client application 112 receives, via network interface 224 of user terminal 102, the message transmitted from user terminal 108 comprising location information of user terminal 108. Based on the communication client application 112 determining that message transmitted at step S304 and the message received from the user terminal 108 both comprise data of the same type (location information), the process then proceeds to step S310.

At step S310, the communication client application 112 determines whether the first location message transmitted at step S304 was transmitted during a current portion of the instant messaging communication session.

The communication client application 112 may perform step S310 in a number of ways.

For example, the communication client application 112 may perform step S310 by determining whether the number of non-location messages (messages not comprising location information) exchanged between the user terminal 102 and user terminal 108 during the instant messaging communication session between the first location message being transmitted at step S304 and the second location message being received at step 308 is greater than a predetermined number.

If the number of non-location messages exchanged between the first location message being transmitted at step S304 and the second location message being received at step 308 is not greater than a predetermined number, then the communication client application 112 determines that the first location message transmitted at step S304 was transmitted during a current portion of the instant messaging communication session. If the number of non-location messages (messages not comprising location information) exchanged between the first location message being transmitted at step S304 and the second location message being received at step 308 is greater than a predetermined number, then the communication client application 112 determines that the first location message transmitted at step S304 was not transmitted during a current portion of the instant messaging communication session.

The predetermined number is selected by the provider of the communication client application 112.

In another example, the communication client application 112 may perform step S310 by determining whether a predetermined amount of time has elapsed between the first location message being transmitted at step S304 and the second location message being received at step 308.

If the predetermined amount of time between the first location message being transmitted at step S304 and the second location message being received at step 308 has not elapsed, then the communication client application 112 determines that the first location message transmitted at step S304 was transmitted during a current portion of the instant messaging communication session. If the predetermined amount of time between the first location message being transmitted at step S304 and the second location message being received at step 308 has elapsed, then the communication client application 112 determines that the first location message transmitted at step S304 was not transmitted during a current portion of the instant messaging communication session.

If the communication client application 112 determines at step S310 that the first location message transmitted at step S304 was transmitted during a current portion of the instant messaging communication session, then the process 300 proceeds to step S312, otherwise the process 300 proceeds to step S314.

At step S312, the communication client application 112 is configured to display an indicator of the location of the user terminal 102 and an indicator of the location of the user terminal 108 in map 408 that was displayed at step S306.

In particular, the communication client application 112 transmits the location information of user terminal 102 and the location of user terminal 108 (received at step S308), with a request for map data via the network interface 224 to the mapping server 116.

The mapping server 116 determines, based on the location information of user terminal 102 and the location of user terminal 108, a new subset of map tile images of the large set of pre-generated map tile images stored by the mapping server 116. The mapping server 116 transmits the new subset of map tile images to the communication client application 112 with an indication of the location of the user terminal 102 and the location of the user terminal 108 with reference to the new subset of map tile images.

The communication client application 112 then displays the map 408 using the new subset of map tile images. The communication client application 112 displays a visual indicator 410 (e.g. pointer, marker or icon) of the location of the user terminal 102 and a visual indicator 414 (e.g. pointer, marker or icon) of the location of the user terminal 108, with reference to the map 408 as shown in FIG. 4b.

FIG. 4b illustrates the communication client application 112 displaying the username 412 of User A 104 in close proximity to the visual indicator 410 to convey that the visual indicator 410 is indicating User A's location, and username 416 of User B 110 in close proximity to the visual indicator 414 to convey that the visual indicator 414 is indicating User B's location, It will be appreciated that if the user terminal 102 and user terminal 108 are located close together, the new subset of map tile images may be the same as the map tiles used to display the map at step S306. However if the user terminal 102 and user terminal 108 are not located close together, the new subset of map tile images will be at a different scale to the map tiles used to display the map at step S306.

At step S314, the communication client application 112 is configured to display an indicator of the location of the user terminal 108 in a second map (not map 408 that was displayed at step S306).

In particular, the communication client application 112 transmits the location of user terminal 108 (received at step S308), with a request for map data via the network interface 224 to the mapping server 116.

The mapping server 116 determines, based on the location information of user terminal 108, a subset of map tile images of the large set of pre-generated map tile images stored by the mapping server 116. The mapping server 116 transmits the subset of map tile images to the communication client application 112 with an indication of the location of the user terminal 108 with reference to the new subset of map tile images.

The communication client application 112 then displays a second map using the new subset of map tile images. The communication client application 112 displays a visual indicator (e.g. pointer, marker or icon) of the location of the user terminal 108 with reference to the second map 408.

In the embodiments described above, in order to supply accurate location information, the location determination module 230 on user terminal 102 may determine and supply location information of the user terminal 102 to the communication client application 112 periodically. This enables, any change in location (i.e. movement) of the user terminal 102 to be displayed on the map 408. Alternatively, after supplying location information to the communication client application 112, the location determination module 230 may only supply additional location information to the communication client application 112 if the location determination module 230 determines that the user terminal 102 has moved (i.e. changed location).

Similarly, the location determination module 230 on user terminal 108 may determine and supply location information of the user terminal 108 to the communication client application 114 periodically, which can be sent by the communication client application 114 to the communication client application 112. This enables, any change in location (i.e. movement) of the user terminal 108 to be displayed on the map 408 (shown in FIG. 4b). Alternatively, after supplying location information to the communication client application 114, the location determination module 230 may only supply additional location information to the communication client application 114 if the location determination module 230 on user terminal 108 determines that the user terminal 108 has moved (i.e. changed location).

It will be appreciated that step S310 advantageously prevents plotting the location of the second user terminal 108 in a map that is unrelated to a current portion of the instant messaging communication session. It will be apparent that plotting the location of the second user terminal 108 in a map that is only viewable in the chat window 403 by User A 104 scrolling back through past conversation activity is undesirable.

However, step S310 is not essential in embodiments of the present disclosure. That is, in response to the communication client application 112 determining that message transmitted at step S304 and the message received from the user terminal 108 both comprise data of the same type (location information), the process may proceed directly to step S312.

By displaying the map 408 in the chat window 403 of the user interface provided by the communication client application 112, continuity of the IM conversation can be maintained and user engagement is increased. Furthermore by plotting both locations of two users on a single map in a chat window, the location of the two users is presented for viewing in a simpler manner than prior art methods.

Whilst embodiments of the present disclosure are described above with reference to the first message transmitted at step S304 and the second message received at step S308 comprising location information, embodiments of the present disclosure extend to other types of media data other than location information.

During the instant messaging communication session, User A 104 can select an option presented by the user interface provided by the communication client application 112 to transfer a media file to User B 110 at the user terminal 108. In response to detecting this selection the communication client application 112 transmits a message comprising the media file over the communications network to user terminal 102

The communication client application 112 then displays the transmitted message in the chat window 403 of the user interface provided by the communication client application 112. The displayed transmitted message may comprise an icon which User A 104 may select to open (i.e. to view or to listen to) the media file.

In response to receiving the message comprising the media file from User A 104, User B 110 may reply by sending a message comprising a further media file from user terminal 108 over the communications network 106 to user terminal 102.

In response to determining that the message transmitted by user terminal 102 and the message received from the user terminal 108 both comprise data of the same type (e.g. audio, image, video), in accordance with the teachings above, the communication client application 112 is configured to generate a composite media file based on the media file in the message transmitted from user terminal 102 to user terminal 108, and the further media file in the message transmitted from user terminal 108 to user terminal 102.

The communication client application 112 displays the generated composite media file in the chat window 403 of the user interface provided by the communication client application 112. For example, the communication client application 112 may display an icon which User A 104 may select to open (i.e. to view or to listen to) the composite media file.

The media files may be audio files in which case, the communication client application 112 is configured to generate a composite audio file based on the audio file in the message transmitted from user terminal 102 to user terminal 108, and the further audio file in the message transmitted from user terminal 108 to user terminal 102.

The media files may be image files (comprising one or more images) in which case, the communication client application 112 is configured to generate a composite image file based on the image file in the message transmitted from user terminal 102 to user terminal 108, and the further image file in the message transmitted from user terminal 108 to user terminal 102.

The media files may be video files in which case, the communication client application 112 is configured to generate a composite video file based on the video file in the message transmitted from user terminal 102 to user terminal 108, and the further video file in the message transmitted from user terminal 108 to user terminal 102.

The generation of the composite media files may comprise joining the media file in the message transmitted from user terminal 102 to user terminal 108 with the further media file in the message transmitted from user terminal 108 to user terminal 102.

Alternatively, the generation of the composite media file may comprise merging media of the media file in the message transmitted from user terminal 102 to user terminal 108 with media of the further media file in the message transmitted from user terminal 108 to user terminal 102. The media processing techniques implemented by the communication client application 112 to generate the composite media file are configured by the provider of the communication client application 112.

In the example wherein the media files are audio files, the communication client application 112 may use known audio processing techniques to stitch together (interlace) portions of both audio files to generate the composite audio file. For example if the audio files both capture a song performed at a concert, the audio processing may enable the portions of the audio files with optimal audio characteristics (e.g. noise, volume, interference) to be stitched together to provide an enhanced composite audio file of the song.

In the example wherein the media files are image files, the communication client application 112 may use known image processing techniques to stitch together (interlace) images of both image files to generate the composite image file (e.g. an image slideshow). For example the image processing may detect images of the same scene in the image files and group these detected images together in the composite image file.

Similarly, in the example wherein the media files are video files, the communication client application 112 may use known video processing techniques to stitch together (interlace) portions of both video files to generate the composite video file. For example the video processing may detect portions of the video files comprising the same scene in the video files and group these portions together in the composite video file.

Embodiments of the present disclosure are described above with reference to the client user interface displaying content in an available area 400 of the display 204. As depicted in FIGS. 4a-b the available area of the display is the whole of the display. However, it is envisaged that the available area of the display (that is the area available to the communication client application 112) may constitute only a portion of the display e.g. with the remainder of the display being used by the operating system and/or other application (s) executed thereon to display other content.

Figure 3:
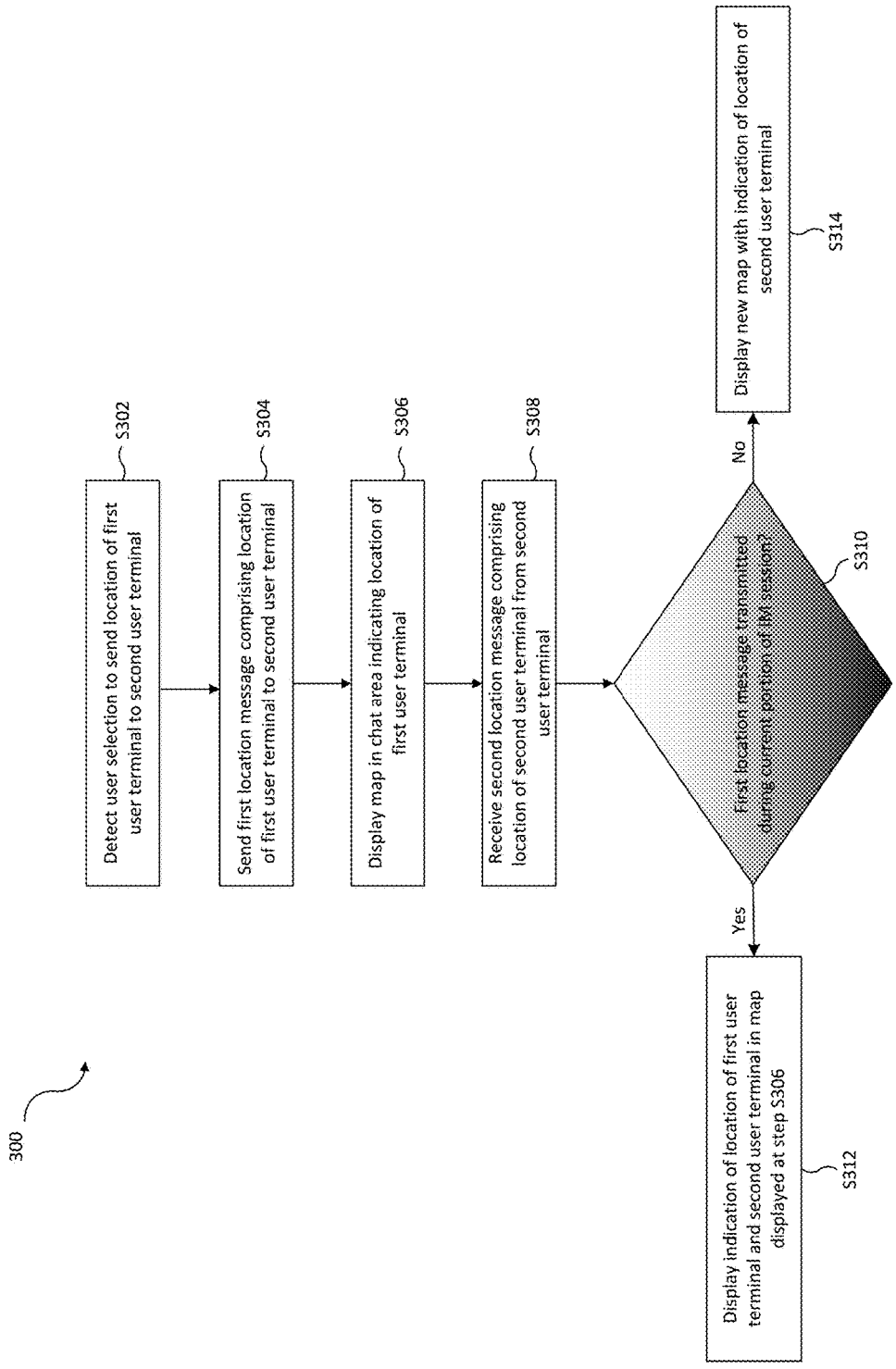
FIG. 3 is a flow chart for a process of generating a composite media object.

The steps shown separately in FIG. 3 may or may not be implemented as separate steps.

Generally, any of the functions described herein can be implemented using software, firmware, hardware (e.g., fixed logic circuitry), or a combination of these implementations. The terms "controller", "functionality", "component", and "application" as used herein generally represent software, firmware, hardware, or a combination thereof. In the case of a software implementation, the controller, functionality, component or application represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
transmitting a first message comprising location information over a communication network from a first user device to a second user device;
displaying a media object on a display of the first user device, the media object including a location of the first user device;
receiving a second message comprising further location information transmitted over said communication network from said second user device;
determining, by instructions executed by a processor, whether a number of non-location messages received between the first message and the second message is greater than a predetermined number;
responsive to determining that the number of non-location messages is not greater than the predetermined number:
generating, by instructions executed by the processor and based on said determining, a composite media object that includes the location of the first user device and a location of the second user device based on the location information and the further location information; and
displaying the composite media object on the display of said first user device by replacing the displayed media object with the composite media object or
responsive to determining that the number of non-location messages is greater than the predetermined number:
generating, by instructions executed by the one or more processors, a new media object that includes the location of the second user device; and
display the new media object on said display of the user device.

2. The method of claim 1, wherein the location information comprises latitude and longitude information associated with said first user device, and the further location information comprises latitude and longitude information associated with said second user device.

3. The method of claim 1, the method comprising detecting selection in a user interface provided by a client application of the first user device to transmit the location information to a user of said second user device, and obtaining the location information associated with said first user device in response to said detection.

4. The method of claim 3, wherein obtaining the location information associated with said first user device comprises transmitting a request for said location information to a location determination module of said first user device, the location determination module configured to obtain a geographic location of said first user device.

5. The method of claim 4, wherein in response to transmitting said location information to said second user device, the method further comprising:
obtaining map data based on said location information; and
displaying a map in a user interface provided by said client application using the map data obtained based on said location information together with the composite media object.

6. The method of claim 5, wherein the first message and the second message are exchanged as part of an instant messaging communication, and wherein the map is displayed in said user interface in an area in which messages exchanged during said instant messaging communication are displayed.

7. The method of claim 5, wherein the obtaining map data based on said location information comprises transmitting said location information to a map server coupled to said communications network and receiving the map data from the map server.

8. The method of claim 5, wherein generating the composite media object comprises obtaining map data based on said location information and said further location information, and displaying the composite media object comprises displaying said map using the map data obtained based on said location information and said further location information.

9. The method of claim 8, wherein the obtaining map data based on said location information and said further location information comprises transmitting said location information and said further location to the map server and receiving the map data from the map server.

10. The method of claim 8, the method further comprising displaying a visual indicator of the location of said first user device and a further visual indicator of a location of said second user device on said map.

11. The method of claim 5, wherein the map data comprises a plurality of map tile images.

12. A user device comprising:
a display;
a network interface configured to transmit and receive messages between the user device and a second user device over a communication network during an instant messaging communication; and
one or more processors configured to execute instructions to cause the user device to perform operations to:
transmit a first message including location information over a communication network from the user device to the second user device;
display a media object on the display of the user device, the media object including a location of the user device;
receive a second message including further location information transmitted over said communication network from said second user device;
determine whether a number of non-location messages received between the first message and the second message is greater than a predetermined number;
responsive to determining that the number of non-location messages is not greater than the predetermined number:
generate, by instructions executed by the one or more processors and based on said determining, a composite media object that includes the location of the user device and a location of the second user device based on the location information and the further location information; and
display the composite media object on said display of the user device by replacing the displayed media object with the composite media object; or
responsive to determining that the number of non-location messages is greater than the predetermined number:
generate, by instructions executed by the one or more processors, a new media object that includes the location of the second user device; and
display the new media object on said display of the user device.

13. A computer-readable storage medium storing instructions that, when executed on a processor of a user device, cause the user device to perform operations to:
transmit a first message including location information over a communication network from said user device to a second user device;
display a media object on a display of said user device, the media object including a location of said user device;
receive a second message including further location information transmitted over said communication network from said second user device;
determine whether a number of non-location messages received between the first message and the second message is greater than a predetermined number;
responsive to determining that the number of non-location messages is not greater than the predetermined number:
generate, by the instructions executed by the processor and based on said determining, a composite media object that includes the location of said user device and a location of said second user device based on the location information and the further location information; and
display the composite media object on the display of the user device by replacing the displayed media object with the composite media object; or
responsive to determining that the number of non-location messages is greater than the predetermined number:
generate, by instructions executed by the processor, a new media object that includes the location of the second user device; and
display the new media object on the display of the user device.

14. The method of claim 10, the method further comprising displaying a username associated with the first user device and a further username associated with the second user device on said map.

15. The user device of claim 12, wherein the first message includes a media file separate from the location information, the second message includes a further media file separate from the further location information, and the composite media object includes a composite media file based on said media file and the further media file.

16. The computer-readable storage medium of claim 13, wherein the first message includes a media file separate from the location information, the second message includes a further media file separate from the further location information, and the composite media object includes a composite media file based on said media file and the further media file.

17. The user device of claim 12, the operations further comprising detecting selection in a user interface provided by a client application of the user device to transmit the location information to a user of said second user device, and obtaining the location information associated with said user device in response to said detection.

18. The user device of claim 12, the operations further comprising in response to transmitting said location information to said second user device:
obtaining map data based on said location information; and
displaying a map in a user interface provided by a client application of the user device using the map data obtained based on said location information together with the composite media object.

19. The computer-readable storage medium of claim 13, the operations further comprising detecting selection in a user interface provided by a client application of said user device to transmit the location information to a user of said second user device, and obtaining the location information associated with said user device in response to said detection.

20. The computer-readable storage medium of claim 13, the operations further comprising in response to transmitting said location information to said second user device:
obtaining map data based on said location information; and
displaying a map in a user interface provided by a client application of said user device using the map data obtained based on said location information together with the composite media object.

* * * * *